RANDOM ACCESS CARD MEMORY SYSTEM

Filed Feb. 1, 1966 6 Sheets-Sheet 1

INVENTOR.
ABRAHAM LICHOWSKY
BY
Attorney

RANDOM ACCESS CARD MEMORY SYSTEM

Filed Feb. 1, 1966 6 Sheets-Sheet 2

INVENTOR.
ABRAHAM LICHOWSKY
BY
Attorney

INVENTOR.
ABRAHAM LICHOWSKY
BY
Attorney

INVENTOR.
ABRAHAM LICHOWSKY
BY
Attorney

Aug. 5, 1969 A. LICHOWSKY 3,460,120

RANDOM ACCESS CARD MEMORY SYSTEM

Filed Feb. 1, 1966 6 Sheets-Sheet 5

INVENTOR.
ABRAHAM LICHOWSKY
BY
[signature]
Attorney

INVENTOR.
ABRAHAM LICHOWSKY
BY
Attorney

United States Patent Office 3,460,120
Patented Aug. 5, 1969

3,460,120

RANDOM ACCESS CARD MEMORY SYSTEM

Abraham Lichowsky, Los Angeles, Calif., assignor to Radio Corporation of America, a corporation of Delaware Filed Feb. 1, 1966, Ser. No. 523,993
Int. Cl. G11b 5/80
U.S. Cl. 340—174.1 12 Claims

ABSTRACT OF THE DISCLOSURE

Information is stored on spaced cards, each of which has identification codes recorded along one of its edges and information tracks parallel to another of its edges. In response to an input address, relative movement occurs between the read-write heads and cards until the heads are at the approximate position of the tracks called for by the address. Identification heads then read the codes appearing on a card or cards and in response thereto, center the read-write heads on the desired tracks. The read-write heads are then moved along the tracks to read from or write on the tracks.

This invention relates to new and improved information storage and retrieval systems.

An object of the invention is to provide relatively simple and reliable systems for the automatic storage and retrieval of a relatively large amount of data.

Another object of the invention is to provide storage systems of the type discussed above which have relatively low average access times.

The systems of the invention include a plurality of transducers, at least some of which are movable along a first path. These transducers interact with a data storage card arranged in a plane which is parallel to the first path. The data storage card has information storage tracks extending along both surfaces of the card in a direction parallel to the first path and position codes recorded along an edge of the card perpendicular to the first path. Means including at least one of the transducers is responsive to tthe position codes for producing relative movement between the card and transducers along a second path perpendicular to the first path for selecting a desired one of the tracks. The invention also includes means for moving one or more of the transducers along said first path after selection of a track. In the case of two such transducers, one may be located adjacent to one surface of the card and the other the opposite surface of the card.

In one form of the invention, the cards are arranged in a circular radial pattern surrounding a central axis which is parallel to the second path discussed above. The transducers are mounted on a shaft extending along said axis and are movable axially, circumferentially, and radially with respect to the shaft. In response to an input address, the shaft rotates the transducers into alignment with a desired one of the cards and simultaneously moves the shaft along its axis bringing the transducer into alignment with a desired group of tracks on the card, including the specified track to be read or written upon. One of the transducers senses the position codes on the selected card and in response thereto and to the input address continues to move the transducers in the axial direction of the shaft until the desired track called for by the address (within the group of tracks previously selected) is reached. Then the other transducers move in the radial direction relative to the shaft to write on or read from the card.

The invention is discussed in greater detail and is shown in the following drawings of which:

Figures 1, 2, 3:
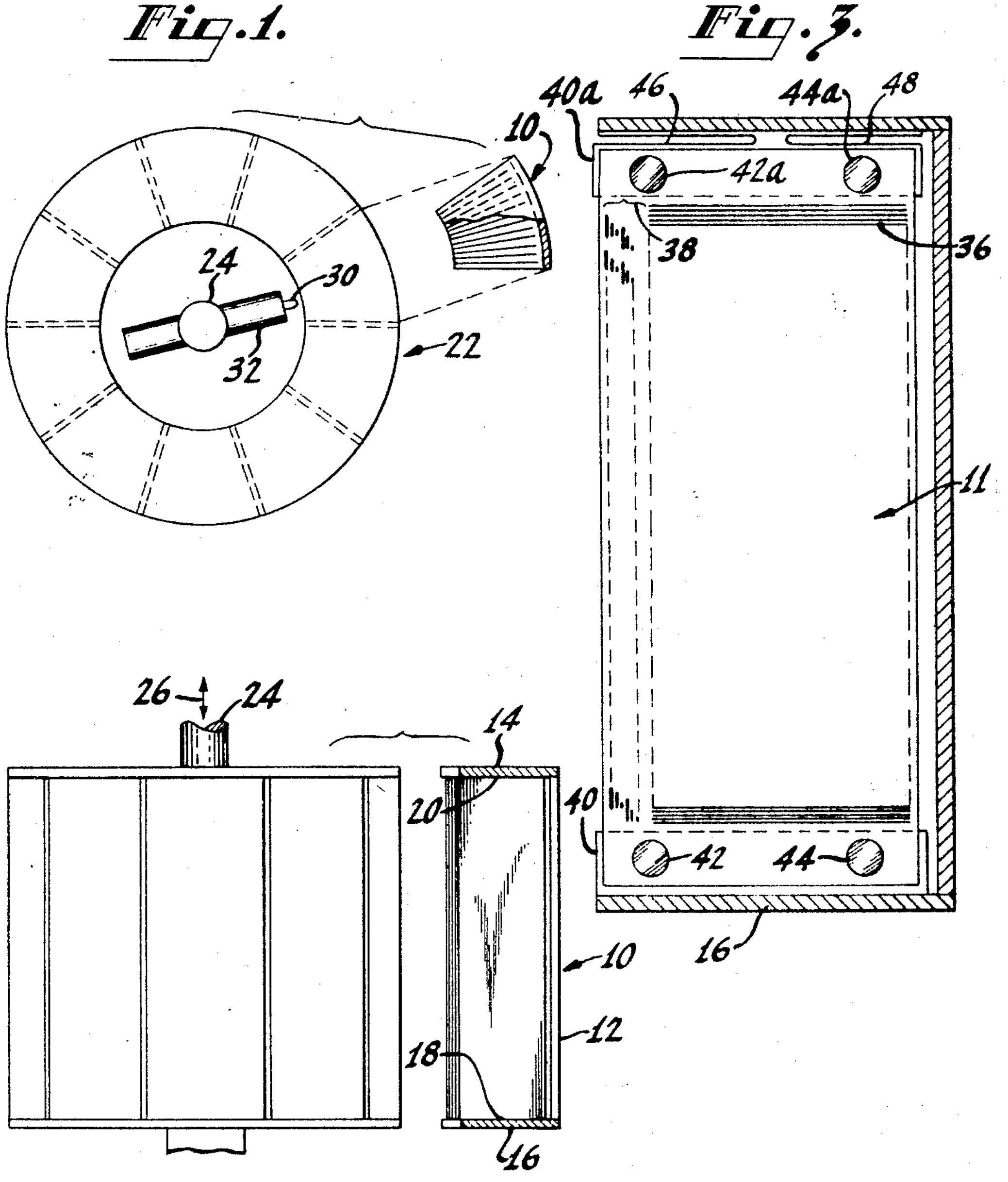
FIGURE 1 is a top view of a group of card magazines according to one form of the invention. This figure also shows a cross-section through one of the magazines.
FIGURE 2 is a side view of the magazines of FIGURE 1 and shows also a side cross-sectional view through one of the magazines.
FIGURE 3 is another cross-sectional view through one of the magazines showing more details of the card.

The card magazines of the system of FIGURES 1–7 are in the shape of cylindrical sectors, as shown most clearly in FIGURES 1 and 2. Each magazine, such as 10, is formed of a back wall 12 and upper and lower walls 14 and 16. The remaining three sides of each magazine are open.

The cards, which are discussed in more detail later, are secured at their shorter edges 18 and 20 to the lower and upper walls 16 and 14 of each magazine. When a full complement of magazines is in place on the support for the magazines, they form together a hollow cylinder 22 such as shown in FIGURE 1. The cards are parallel to the cylinder axis and extend radially from the axis as is shown more clearly in the schematic showing of FIGURE 4. Any magazine readily may be removed and replaced with another magazine.

A shaft 24 is located within the hollow cylinder of FIGURE 1. This shaft is rotatable about the cylinder axis and is also movable in the vertical direction (in the direction in and out of the paper in FIGURE 1 and in the direction of arrows 26 in FIGURE 2). The read-write heads 30 are shown in their retracted position within the head moving mechanism 32 in FIGURE 1. The latter is cylindrically shaped and extends in a radial direction from the axis of shaft 24.

A more detailed showing of the card 11 appears in FIGURE 3. In a preferred form of the invention, the card is made of a thin, flexible, plastic material and is coated on its opposite surfaces with magnetic material. The information tracks, some of which are shown at 36, extend horizontally in a direction parallel to the short dimension of the card.

Track identification codes 38 are located along one edge portion of each card. The codes may be recorded in two "columns," each column containing the same code groups but one column slightly lower than the other so that a particular code in one line of the first column overlaps the corresponding code on the same line in the next column. Preferably the overlap is 180°, that is, a code group in the second column starts at the center (half-way down) the same code group in the first column. However, any one of a number of other coding arrangements may be used instead, depending on system parameters. As one example, there may be a single code group, per track, recorded alongside of and in precise alignment with the track.

Each card is mounted on its own supporting structure and is spaced from the next adjacent card. This supporting structure may include a strip of sheet metal 40 secured to the lower wall 16 of the magazine and formed with two posts 42 and 44. These posts mate with holes in the card. The support for the upper part of the card is similar to the one for the lower part of the card except for the slots 46 and 48. These slots allow the upper support to spring bias the card and maintain it relatively taut. If desired, one of the posts such as 44a and 44 of each pair of posts may be spring biased away from the other post in order slightly to tension the card along its short dimension.

Figure 4:
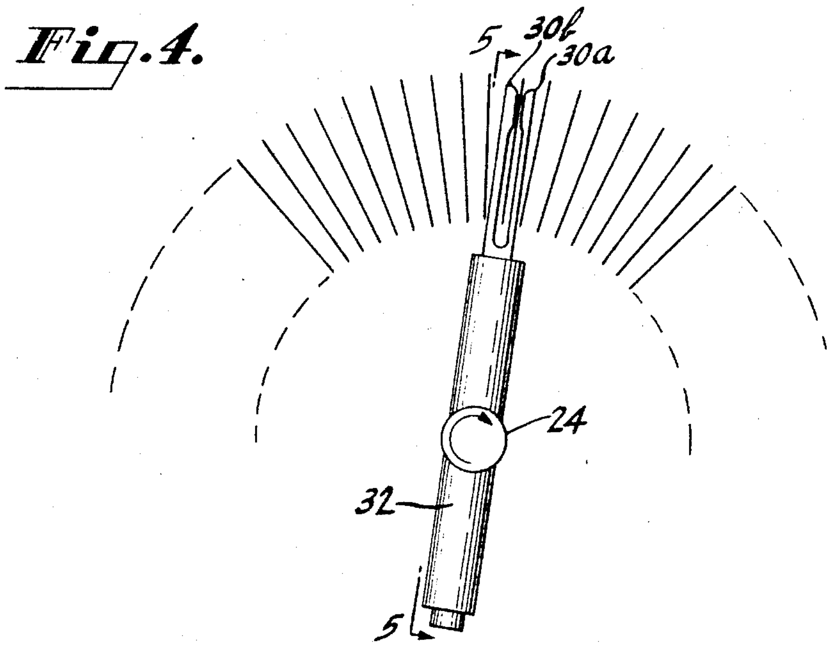
FIGURE 4 is a schematic, cross-sectional view of a portion of the system of the invention showing the read-write heads in their extended position.
Figure 5:
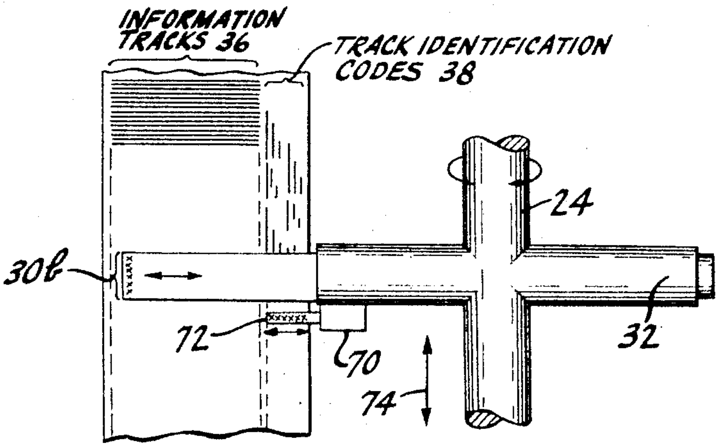
FIGURE 5 is a side cross-sectional view taken along line 5—5 of FIGURE 4.
Figure 6:
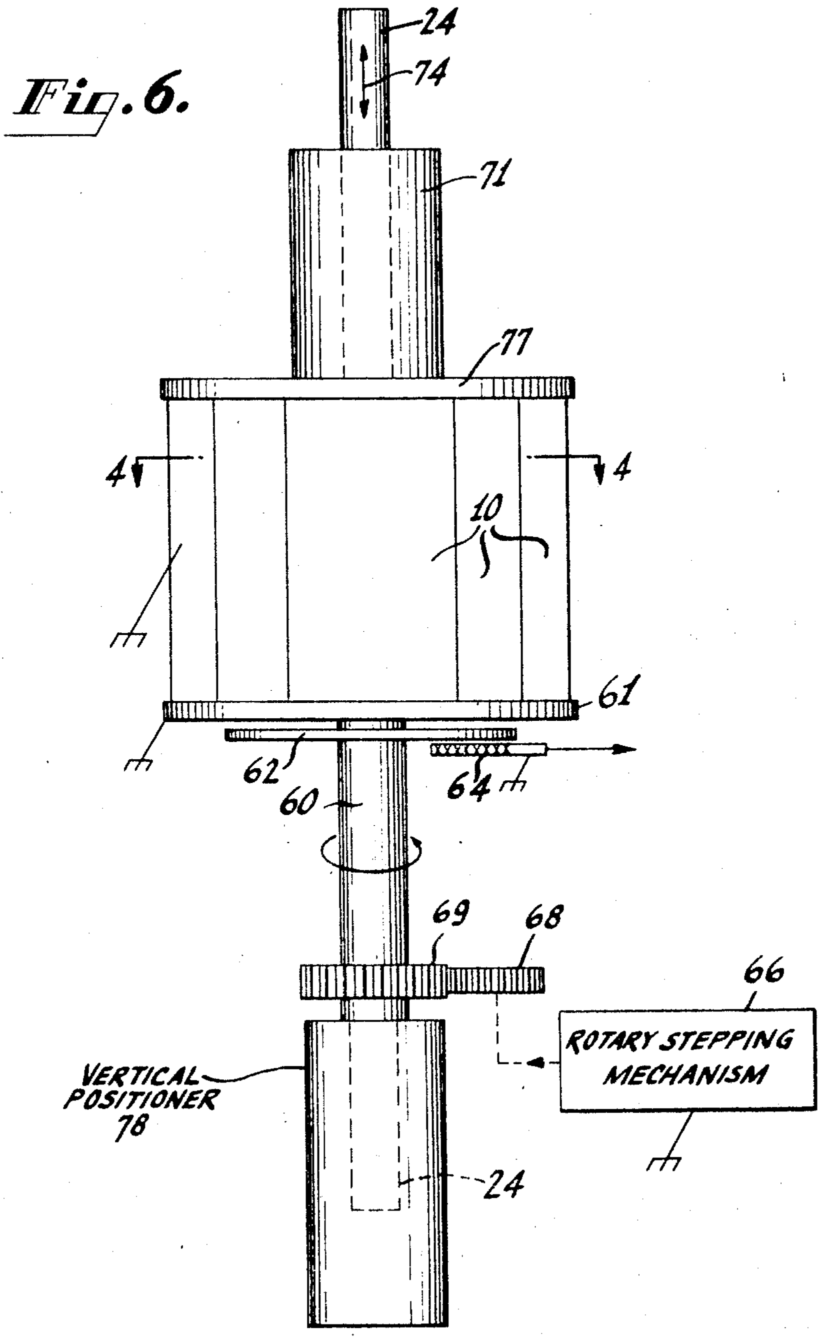
FIGURE 6 is a plan view showing additional features of the invention.

The operation of those portions of the system which have been illustrated so far is depicted in FIGURES 4, 5 and 6. The read-write heads 30 are mounted to a radial drive means 32 which may be a pneumatic or electrical actuator. The drive means 32 is secured to the shaft 24 and this shaft is slidably mounted in a hollow cylindrical element or shaft 60 shown in FIGURE 6. The hollow shaft 60 is rotatably mounted in the support 61 for the magazines 10. A code disc 62 is secured to and rotates with the hollow shaft 60. A group of stationary read-write heads 64 located adjacent to the disc produces an output indicative of the angular position of the disc and therefore of the angular position of the hollow shaft 60.

In the operation of the arrangement of FIGURES 4, 5 and 6, the read-write heads are initially in their retracted position as shown in FIGURE 1. In response to an input address, the rotary stepping mechanism 66 rotates the hollow shaft 60 via the pinion 68 and gear 69. The shaft 24 is keyed to the hollow shaft 60 and rotates therewith. When the code produced by heads 64 indicates that the read-write heads are positioned next to the card called for by the address, the rotary stepping mechanism is inactivated.

During the rotation of the shaft 24 and hollow shaft 60 by the rotary stepping mechanism 66, and also during the motion of the heads 72, the shaft 24 may be moved vertically into rough alignment with the desired information track. Such movement is by the vertical positioner 78. This movement is controlled by the means 71, known as a digital position encoder, for indicating the vertical position of the shaft. The encoder may include means rotatably mounted on the end wall 77 of the support for the card magazine and slidably mounted on the shaft 24 to permit vertical movement of the shaft. The encoder includes means (magnetic, optical or the like) for sensing binary indications on the shaft 24, these indications being indicative of the vertical shaft position. Control signals are derived from these indications by comparing them with a desired track address, in the manner discussed later in connection with FIGURE 7. These control signals are applied to the vertical positioner 78 for causing the latter to move the shaft 24 in the direction of arrows 74 until the read heads 30 are at the position of a group of tracks containing the information tracks it is desired to select.

The vertical positioner 78 may include a pneumatic or hydraulic cylinder or an electric servo motor having a gear engaged with a longitudinal gear track on shaft 24. This positioner, as it is fixed to the hollow element 60, rotates with the element 60.

Summarizing up to this point, the stepping mechanism 66 rotates the shaft 24 and the code and information heads to the desired card. During this rotation, the vertical positioner 78 moves the shaft 24 vertically, as directed by the track address and the information supplied by encoder 71, to the approximate position of the desired track or tracks.

When the stepping mechanism 66 is inactivated, actuator 70 (FIGURE 5), which may be a solenoid or a pneumatic (a fluid power) device, is energized. It moves a group of "Hall" type read heads 72 in the radial direction relative to shaft 24 until the heads 72 are positioned to read the track identification codes 38. Hall type heads are known in the art and are flux sensitive devices which are capable of reading a code pattern both when the head is stationary relative to the recording medium and when the head is moving relative to the recording medium.

When the output code supplied by the position encoder 71 indicates that the read heads 30 have reached the approximate position of the desired track or tracks, and the stepping mechanism 66 is inactivated, the track identification information read from the selected card by the heads 72 is compared with the address of the desired information track. In response to this comparison, control signals are applied to the vertical positioner 78 for continuing the motion of the shaft 24 in the vertical direction, indicated by arrows 74, until the read-write heads 30 are precisely centered on the desired track or tracks.

When the code read heads 72 (FIGURE 5) produce an output which indicates that the read-write heads 30 are at the desired position, the radial drive means 32 is actuated. This causes the read-write heads 30a, 30b to move in the radial direction, at a constant velocity, in alignment with the information tracks.

As already mentioned, there are read-write heads located on each side of the card for accessing tracks on both surfaces of the cards. There may be a single read-write head or a group of read-write heads for each side of the card. In the example illustrated in FIGURE 5, six such heads 30b are illustrated by 6 crosses. (There are six corresponding heads 30a for the opposite surface of the card).

If the tracks are relatively widely spaced from one another, the spacing of the heads may be such that they read or write the bits on 6 adjacent lines at a time. It is possible thus to record or read, simultaneously, six bits on one side of a card and six bits on the other side. Each head records or reads bits serially along its track.

If the tracks are very closely spaced to obtain maximum bit packing density, and it is desired to use a plurality of read-write heads, it may not be possible to place the heads as close to one another as the adjacent tracks. In this case, the heads may be arranged to read or write the information in interlaced fashion. In other words, if the first or uppermost head is on line 1, the second head may be on line 21, the third head on line 41 and so on and so on. After accessing this group of tracks (1, 21, 41, 61, 81, 101), the heads may be moved one track position to access tracks 2, 22 . . . 82, 102, and then tracks 3, 23 . . . 83, 103, and so on.

While in the preferred form of the invention, information is recorded on magnetically coated cards, the invention is not limited to this specific form of recorded information. For example, the track identification code may be optically recorded, that is, black and white areas, and the transducer means 72 may be photocells or the like. In a similar fashion, the tracks may contain optical or other information rather than magnetic information, with appropriately chosen transducers.

Figure 7:
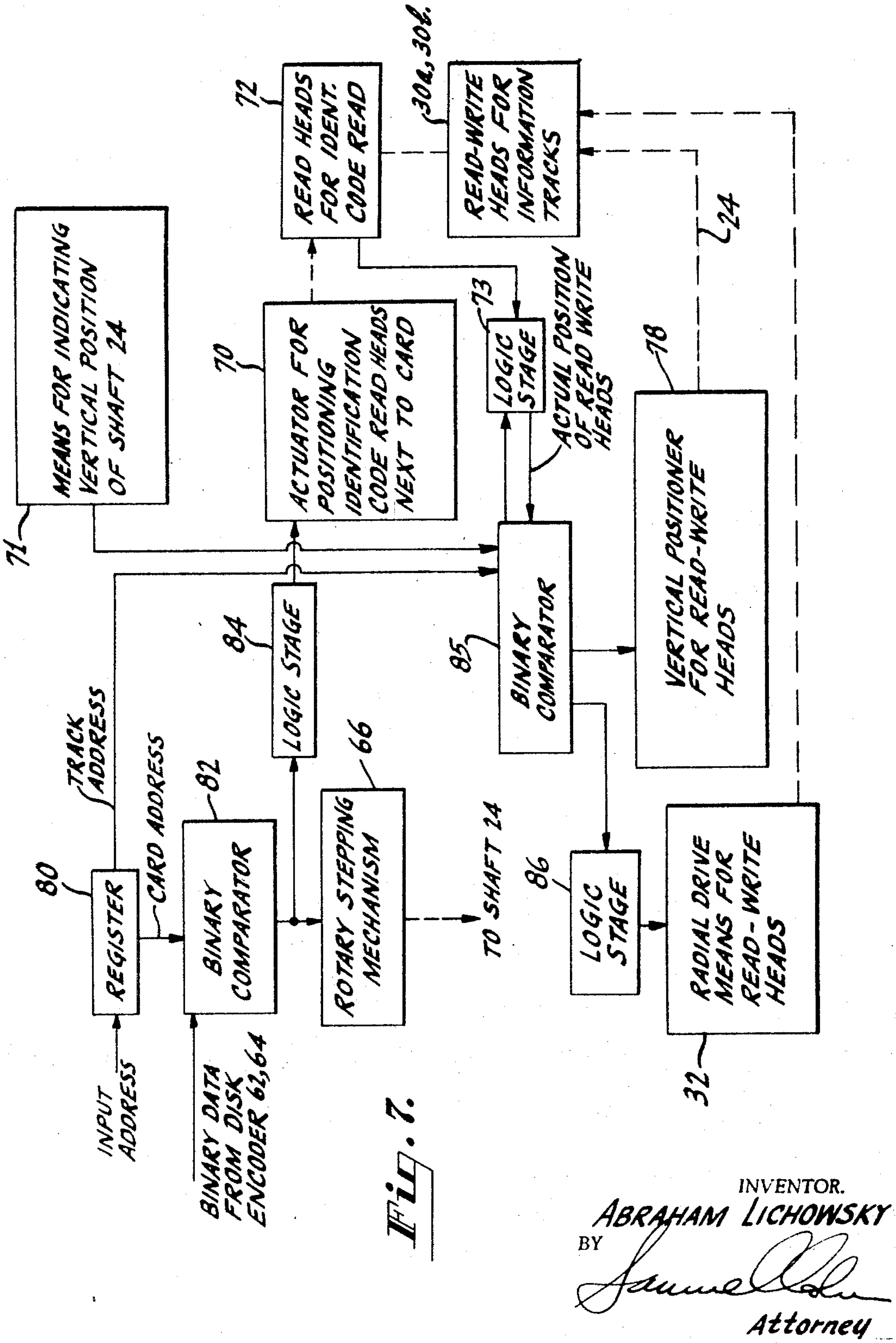
FIGURE 7 is a block circuit diagram of the control system for the arrangement of the previous figures.

The control system of the invention is shown in block circuit diagram form in FIGURE 7. The input address is applied to a register 80 which stores in one section thereof the card address and in another section thereof the track address. The track address is applied from the register 80 to binary comparator 85 and the card address to binary comparator 82. A second input to comparator 82 is the binary data supplied by the disc encoder 62, 64 of FIGURE 6.

The binary comparator 82 compares its two inputs and, when they differ, it produces an output which is applied to the stepping mechanism 66. This output may be utilized directly in binary form or converted to analog control signals, depending upon the particular type of stepping mechanism employed. The output of the comparator drives the rotary stepping mechanism 66 and shaft 24 to a position such that the read-write heads are aligned with the card on which it is desired to read or write. At that time the output of the binary comparator indicates identity or, in the analog case, drops to zero.

The binary comparator 82 also applies its output to the logic stage 84. When this output indicates identity, that is, when the stepping mechanism has rotated the heads to the desired card, the logic stage 84 energizes the actuator 70 (see FIGURE 5). The actuator moves the read heads 72 in the radial direction to a position adjacent to the track identification codes of the selected card. As already mentioned, the read heads 72 sense the code permanently recorded on the card. They apply the binary number thereby obtained to the logic stage 73. This binary number (a group of signals) is indicative of the precise position of the read-write heads 30*a*, 30*b* of FIGURES 4 and 5 with respect to the information tracks on the card. At an appropriate time, as discussed later, this number passes through the stage 73 to the comparator 85.

During the rotation of shaft 24 by the stepping mechanism 66, the vertical position digital encoder 71 applies an input to the binary comparator 85. This input is a group of signals indicative of a binary number and this binary number, in turn, is indicative of the vertical position of the shaft 24. The comparator 85 compares this number with the track address supplied by the register 80 and, in response to these inputs, applies drive signals to the vertical positioner 78. The latter moves the shaft 24 in the vertical direction to a position such that the read-write heads 30 are adjacent to a group of tracks within which the desired track is located.

When the numbers supplied by the encoder 71 and register 80 do match, the read heads are very close to the desired track but may not be precisely centered on that track. At this point, the binary comparator 85 provides an output to the logic stage 73. This output enables gates in the logic circuit and the enabled gates apply the code read by the read heads 72 to the binary comparator 85.

The combined input to the binary comparator 85 from the vertical position digital encoder 71 and the read heads 72 (this combined input is a precise indication of the position of the heads 30 as it specifies both a group of tracks and a single track within that group), is compared to the track address supplied by the register 80. When the combined input is different from the address in register 80, the comparator 85 produces an output which continues to actuate the vertical positioner 78. This positioner therefore continues to drive the read-write heads until they are precisely centered at the location of the desired track or group of tracks. At that time, the output of the binary comparator 85 indicates identity.

Logic stage 86 senses the identity output of the binary comparator 85 and in response thereto actuates the radial drive means 32 for the read-write heads. This radial drive means causes the heads to move at a constant speed along the track or group of tracks selected.

The actual circuits making up the blocks of FIGURE 7 are all well-known and need not be discussed in detail. It should also be mentioned that circuit refinements such as rate feedback in the various servo loops for stabilization and other engineering details not essential to an understanding of the invention, are not discussed herein.

A second form of the invention, this one for storing substantially less data than the first form of the invention discussed above, is shown in FIGURE 8. It includes a chassis, shown schematically at 90, in which is mounted a head drive mechanism 92. This mechanism may be a pneumatic or electrical actuator. The read-write heads, one of which is designated schematically by the circle 94, are mounted in a comb-shaped structure 96. The outer two teeth of the comb each mount one head and the inner teeth of the comb each mount two heads making a total of 10 heads, one for each side of each card. 5 Hall type read heads 98 are mounted in a fixed supporting structure 100. The purpose of these heads is to read the track identification codes recorded along the edge of the cards, as is discussed shortly.

The cards themselves may be of the same type as discussed previously, namely, rectangularly shaped plastic cards coated with magnetic material. In the specific form of the invention illustrated, there are 5 such cards 102 located in a magazine 104. The information tracks extend in the horizontal direction, that is, in the direction parallel to the direction of movement 106 of the read-write heads 94. A position code is recorded along one edge of each card.

The magazine 104 is fixed to a shaft 108 which is movable vertically, that is, in the direction of arrows 110. The shaft 108 is mounted at its lower end in a keyed slider bearing 112 which is fixed to the support 90, and contains the drive mechanism. This drive mechanism may be a pneumatic hydraulic or electrical actuator of the type already discussed. At the upper end, the shaft passes through another slider bearing 114 containing a digital position encoder.

Figure 8:
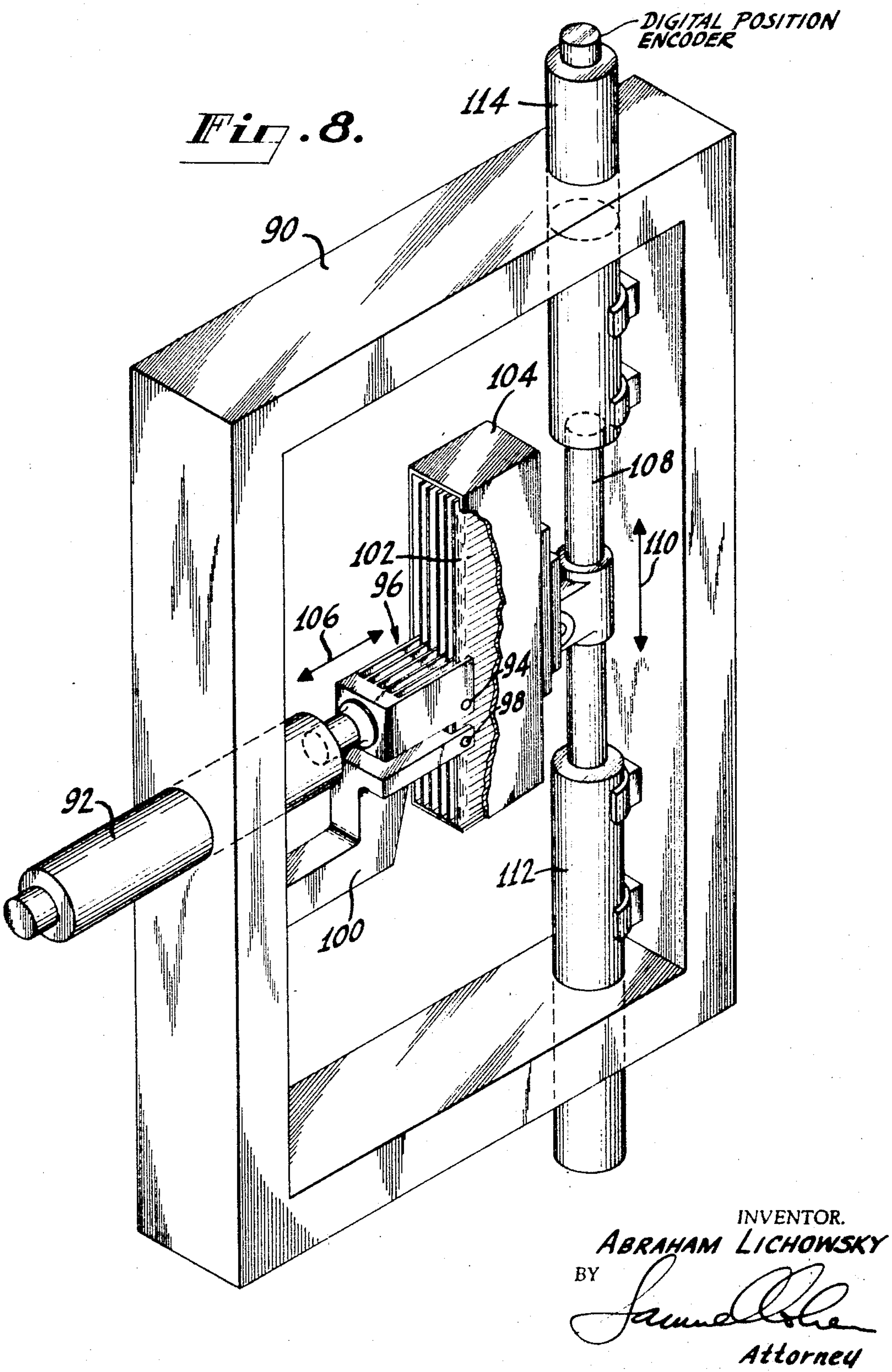
FIGURE 8 is a perspective view of a second form of the invention.

In them operation of the system of FIGURE 8, a desired track address electronically selects one of five address code heads and one of a pair of corresponding read-write heads. Simultaneously, the address is also compared to the output of the linear digital position encoder and, as previously detailed, a two-step vertical positioning cycle is initiated causing the magazine 104 to position itself precisely with respect to the read-write heads based on the code groups recorded on the edge of the cards. When the correct track is reached, and relative motion has settled down sufficiently (the feedback control system is always activated and stabilized at one track address until a new address command is issued) the drive means 92 is energized. The drive means 92 causes the heads 94 to move in the direction of arrows 106 for reading from or writing on the selected tracks at a precisely controlled velocity.

It should be appreciated that there are a number of different ways of operating the system of FIGURE 8. For example, one side of a card may be accessed while the read-write heads 94 are moving in one direction and the opposite side read while the heads are moving in the opposite direction. It should also be appreciated that while in the embodiment of the invention illustrated there is one set of 10 heads, several sets of 10 heads may be employed instead analogously to the arrangement of FIGURES 1–6.

Figure 9:
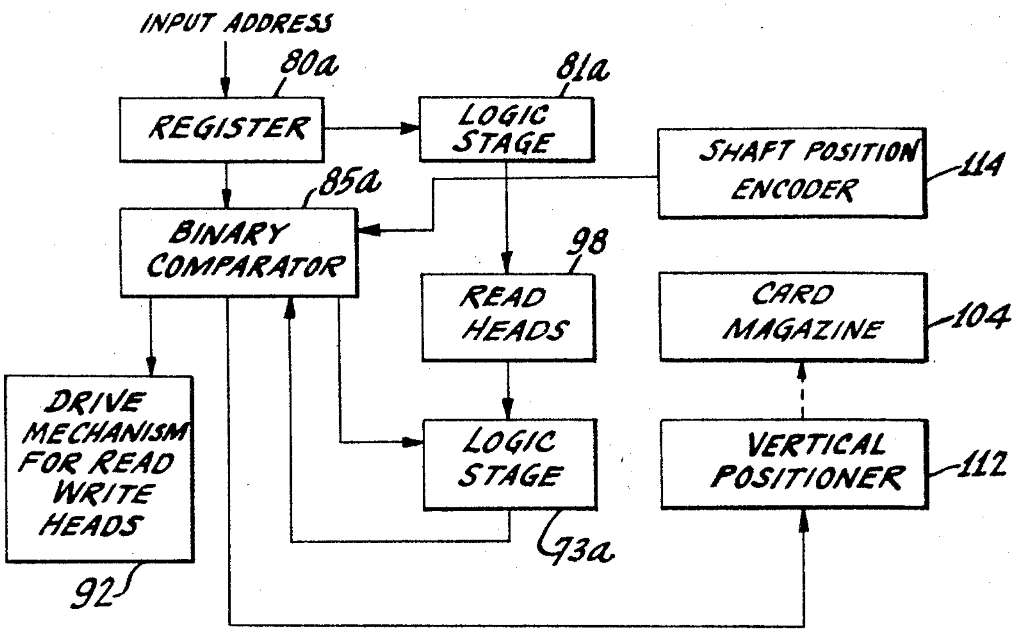
FIGURE 9 is a block circuit diagram of the control system for the embodiment of the invention shown in FIGURE 8.

A block circuit diagram of the control system for the apparatus of FIGURE 8 is shown in FIGURE 9. It operates in a manner analogous to the control system of FIGURE 7, however, as it does not have to perform as many functions it is considerably simpler. The input address indicative of the card desired and the track on the card it is desired to write on or read from is applied to its register 80*a*. The portion of this address indicative of the card desired is applied via logic stage 81*a*, to the read heads 98. This signal causes the read head 98 for the desired card to be activated and the other read heads effectively to be inactivated. (This same signal may also be employed to activate the desired information read head or heads 94).

The portion of the input address indicative of the track desired is applied to the binary comparator 85*a*. A second input to the binary comparator is the output of the shaft position encoder 114. This second input indicates the actual position of the shaft 108 of FIGURE 8 and therefore the actual position of the card magazine 104. The binary comparator compares these two numbers and, when they are equal, applies an enabling signal to the logic stage 73*a*. Thereupon, the track identification code read by the enabled one of the read heads 98 is applied through logic stage 73*a* to the binary comparator 85*a*.

The binary comparator now compares the combined input from the shaft position encoder 114 and the logic stage 73*a* (this combined input is indicative of the actual position of the magazine and therefore the actual position of the desired track), with the track address supplied by the register 80*a*. The output produced by the binary comparator 85*a* continues to drive the vertical positioner 112 until the read-write heads are centered on the desired track or tracks. When this occurs, the output of the binary comparator 85*a* activates the drive mechanism 92 for the read-write heads. This drive mechanism moves the read-write heads along the desired tracks at a constant rate of speed.

In the examples of the invention discussed above, the recorded data is binary data. It should be appreciated that the invention is also applicable to the storage of analog data such as video information.

What is claimed is:

1. A memory comprising, in combination:
a plurality of transducers at least some of which are movable along at least a first path;
a data storage card arranged in a plane which is parallel to the first path and having information storage tracks extending along at least one surface of the card in a direction parallel to said first path, and position codes recorded along an edge of the card perpendicular to the first path;
means including at least one of said transducers responsive to said position codes for producing relative movement between the card and transducers along a second path perpendicular to the first path for selecting a desired one of the tracks; and
means for moving at least another of said transducers along said first path after selection of a track, said transducer being located adjacent to said one surface of the card.

2. A memory as set forth in claim 1 wherein each card has information storage tracks extending along both surfaces thereof and wherein said last-named means comprises:
means for moving at least two of said transducers along said first path after selection of a track, one transducer being located adjacent to one surface of the card and the other, the opposite surface of the card.

3. A memory as set forth in claim 2, further including a plurality of other data storage cards arranged parallel to the data storage card of claim 1, and wherein there are at least two transducers per card, one for each card surface, which are movable, as a group, along the tracks of the respective cards.

4. A memory as set forth in claim 1 wherein the transducers are movable solely along the first path and wherein the card is movable solely along the second path.

5. A memory comprising, in combination:
a plurality of transducers which are movable in a first direction along parallel paths;
$n$ data storage cards arranged in a magazine in planes which are parallel to each other and to said first direction, and having information storage tracks extending across both surfaces of the card in said first direction, and position codes recorded along an edge perpendicular to the first direction of at least one of the cards;
means including at least one of said transducers responsive to said position codes for moving the magazine and cards along a second path perpendicular to the first direction for selecting a desired one of the tracks; and
means for moving $2n$ of said transducers in said first direction along parallel paths for accessing $2n$ tracks on the cards, one track per card surface, where $n$ is an integer.

6. A memory comprising, in combination:
a shaft;
a transducer which is mounted on the shaft and is movable circumferentially of, radially of, and parallel to the shaft axis;
a plurality of data storage cards arranged in radial planes relative to said axis, each card having a plurality of tracks parallel to one of said radial paths; and
means for moving said transducer circumferentially till it is adjacent a desired one of the cards, parallel to said shaft axis till it is adjacent to a track it is desired to select on that card, and radially along that track.

7. A memory as set forth in claim 6 in which the cards are located in removable magazines, each magazine being in the shape of a sector of a hollow cylinder.

8. A memory as set forth in claim 6 in which each card has track identifying codes recorded along an edge of the card parallel to said axis, and wherein the means for moving said transducer includes means responsive to said code for effecting the movement of said transducer in a direction parallel to said shaft axis.

9. A memory as set forth in claim 6, further including means coupled to said shaft for indicating its angular position, and wherein the means for moving said transducer includes means responsive to the angular position indicating means for effecting the movement of the transducer circumferentially of said shaft axis.

10. A memory comprising, in combination:
a plurality of transducers at least some of which are movable along at least a first path;
a data storage card arranged in a plane which is parallel to the first path and having information storage tracks extending across at least one surface of the card in a direction parallel to said first path, and position codes recorded along an edge of the card perpendicular to the first path;
coarse positioning means responsive to an input address for producing relative movement between the card and transducers to a position a first of said transducers adjacent to a group of tracks containing the track called for by said input address;
fine positioning means responsive to said input address and a position code sensed by a second of said transducers for producing relative movement between the card and transducers for centering said first transducer on the track called for by said input address; and
means responsive to the centering of said first transducer on said track for moving said first transducer along said first path.

11. A memory as set forth in claim 10 wherein the relative moment produced by the coarse and fine positioning means comprises movement along a second path perpendicular to the first path.

12. A memory as set forth in claim 11, further including means responsive to said input address for moving the transducers along a circular path around an axis, said axis being parallel to said second path.

References Cited

UNITED STATES PATENTS

| | | | |
|---|---|---|---|
| 3,293,629 | 12/1966 | Oliver | 340—174.1 |
| 3,183,494 | 5/1965 | Welsh | 340—174.1 |
| 3,034,643 | 5/1962 | Keller et al. | 340—174.1 |

OTHER REFERENCES

Lynott, J. J., Document File Drive, IBM Technical Disclosure Bulletin, vol. 2, No. 5, pp. 27–28, February 1960.

BERNARD KONICK, Primary Examiner

V. P. CANNEY, Assistant Examiner

U.S. Cl. X.R.

179—100